United States Patent
Wang et al.

(10) Patent No.: US 11,277,564 B2
(45) Date of Patent: Mar. 15, 2022

(54) METHOD FOR COMPENSATING FOR IMAGE QUALITY OF OPTICAL SYSTEM BY MEANS OF LENS ADJUSTMENT

(71) Applicant: NINGBO SUNNY OPOTECH CO., LTD., Zhejiang (CN)

(72) Inventors: Mingzhu Wang, Zhejiang (CN); Chunmei Liu, Zhejiang (CN); Hailong Liao, Zhejiang (CN); Yiqi Wang, Zhejiang (CN); Huaigang Zhuang, Zhejiang (CN); Nan Guo, Zhejiang (CN)

(73) Assignee: NINGBO SUNNY OPOTECH CO., LTD.

( * ) Notice: Subject to any disclaimer, the term of this patent is extended or adjusted under 35 U.S.C. 154(b) by 0 days.

(21) Appl. No.: 16/837,293

(22) Filed: Apr. 1, 2020

(65) Prior Publication Data

US 2020/0228715 A1 Jul. 16, 2020

Related U.S. Application Data

(63) Continuation of application No. 16/062,013, filed as application No. PCT/CN2016/110372 on Dec. 16, 2016, now Pat. No. 10,778,897.

(30) Foreign Application Priority Data

Dec. 16, 2015 (CN) .......................... 201510942802.9
Dec. 16, 2016 (CN) .......................... 201611167805.0

(51) Int. Cl.
H04N 5/232 (2006.01)
H04N 17/00 (2006.01)
(Continued)

(52) U.S. Cl.
CPC ..... *H04N 5/23287* (2013.01); *G02B 27/0012* (2013.01); *G02B 27/0025* (2013.01);
(Continued)

(58) Field of Classification Search
CPC .. H04N 5/23287; H04N 5/232; H04N 17/002; H04N 5/217; H04N 5/35721;
(Continued)

(56) References Cited

U.S. PATENT DOCUMENTS 6,430,368 B1  8/2002 Hata
2011/0128421 A1  6/2011 Yahata
(Continued)

FOREIGN PATENT DOCUMENTS

JP  2007065515 A  3/2007
JP  2008014827 A  1/2008
(Continued)

OTHER PUBLICATIONS

Julie Bentley & Craig Olson, Field Guide to Lens Design, FG 27 SPIE Press, USA (2012), 158 pages, reference "XP 55748962A I."

*Primary Examiner* — Gevell V Selby
(74) *Attorney, Agent, or Firm* — Barnes & Thornburg LLP

(57) ABSTRACT

The present disclosure discloses a method for compensating for image quality of an optical system by means of a lens adjustment, applicable to a camera module comprising an adjustable lens or an adjustable lens set, the method comprising the following steps: (A) determining, based on imaging information of a to-be-adjusted optical system, parameters that need to be adjusted for compensating for the image quality; (B) establishing functions of relation between the parameters that need to be adjusted for compensating for the image quality and a to-be-adjusted lens factors; and (C) determining an adjustment mode and an adjustment amount (Continued)

for the to-be-adjusted lens based on the relation between the parameters that need to be adjusted for compensating for the image quality and the to-be-adjusted lens factors. Whereby, the present disclosure implements the accurate adjustment of the camera module by using an optical method during assembly and production, has high adjustment precision and high efficiency, can meet the production requirements such as high quality, low costs and high efficiency, and improves the image quality of the optical system.

6 Claims, 12 Drawing Sheets

(51) Int. Cl.
*G02B 27/00* (2006.01)
*H04N 5/217* (2011.01)
*G06T 7/00* (2017.01)
*H04N 5/357* (2011.01)
*H04N 5/225* (2006.01)

(52) U.S. Cl.
CPC ........... *G06T 7/0002* (2013.01); *H04N 5/217* (2013.01); *H04N 5/232* (2013.01); *H04N 5/23216* (2013.01); *H04N 5/35721* (2018.08); *H04N 17/002* (2013.01); *G06T 2207/30168* (2013.01); *H04N 5/2254* (2013.01)

(58) Field of Classification Search
CPC ............. H04N 5/23216; H04N 5/2254; G02B 27/0025; G02B 27/0012; G06T 7/0002; G06T 2207/30168
See application file for complete search history.

(56) References Cited

U.S. PATENT DOCUMENTS

| | | | |
|---|---|---|---|
| 2012/0013760 A1 | 1/2012 | Parodi-Keravec et al. | |
| 2014/0022418 A1* | 1/2014 | Kano | H04N 5/217 348/241 |
| 2014/0293440 A1* | 10/2014 | Okawa | G03B 5/00 359/698 |
| 2015/0124153 A1 | 5/2015 | Hamada | |
| 2015/0189174 A1* | 7/2015 | Bao | H04N 5/238 348/218.1 |
| 2015/0350497 A1 | 12/2015 | Gamadia et al. | |
| 2016/0054642 A1 | 2/2016 | Takeuchi | |
| 2016/0103318 A1* | 4/2016 | Du | G02B 27/0068 345/633 |

FOREIGN PATENT DOCUMENTS

| | | |
|---|---|---|
| JP | 2013198053 A | 9/2013 |
| JP | 2014035381 A | 2/2014 |
| JP | 2014190776 A | 10/2014 |

* cited by examiner

METHOD FOR COMPENSATING FOR IMAGE QUALITY OF OPTICAL SYSTEM BY MEANS OF LENS ADJUSTMENT

CROSS-REFERENCE TO RELATED APPLICATION

This application is a continuation of U.S. application Ser. No. 16/062,013, filed on Dec. 16, 2016, which claims the priorities to Chinese Patent Application No. 201510942802.9, filed on Dec. 16, 2015, and Chinese Patent Application No. 201611167805.0, filed on Dec. 16, 2016. The contents of the aforementioned applications are all incorporated herein by reference in their entireties.

TECHNICAL FIELD

The present disclosure relates to the field of optical system imaging, and more particularly to a method for compensating for image quality of an optical system by means of a lens adjustment or a lens assembly adjustment.

BACKGROUND

With the current development of camera modules, module production involves assembling main components such as chips and lenses. The quality of the lens assembly and the cooperation between the lens assembly and the module are the main factors affecting the image quality of the optical system. In the current production, image quality is ascertained by controlling the quality of the lens assembly, tolerances of the main components, and the assembly tolerance of the module. The lens assembly and the module are generally produced by controlling the tolerances of components, namely the assembly precision, and carrying out product testing to ensure the image quality. This method has very high requirements on the components and the assembly process, and the image quality of the product cannot be predicted before testing, which may lead to a great yield loss for high-end products, resulting in high manufacturing costs of the lens assembly or the camera module.

In conventional module design, due to the quality of the lens assembly and assembly of several elements with inclination tolerances, the imaging plane of the lens assembly on the photosensitive chip is inclined relative to the ideal plane. In the case of central focusing, the definition at the periphery of the image decreases with the inclination of the image plane, resulting in uneven imaging definition of the field of view. In addition, due to the tolerance introduced during lens fabrication, field curvature (that is, the central focus and the peripheral focus are not in a same plane) occurs during imaging of the optical system after assembly. In this case, the image quality of the camera module is also affected.

Therefore, how to improve the production efficiency, reduce costs, and improve the image quality in the camera module production, is currently still the important direction for the development of modules. In addition, during the production of the camera module, measures have already been taken to properly adjust the assembly of the camera module, to overcome the defect of decrease in the image quality of the camera module caused by factors such as eccentricity, the image plane inclination, the field curvature, and the peak during the assembly process of the camera module, thereby improving the production efficiency and image quality of the product. Therefore, how to adjust the elements assembled in the optical system quickly by using an optical method during module assembly and production to ensure the image quality and improve the product yield remains currently an urgent problem to be solved in the camera module production.

With the continuous development of various smart devices, higher requirements are imposed on camera modules and various camera devices. As the lens assembly is an indispensable component in the camera module or camera device, higher requirements are also imposed on the lens assembly.

On one hand, the image quality is an important factor for evaluating the quality of the lens assembly. After satisfying basic conditions, the lens assembly design is in constant pursuit to improve the image quality.

On the other hand, another important aspect that needs to be considered in the lens assembly design is how to quickly reach the design standard and widely apply it to practical production to improve the product yield.

In the existing lens designs, a single variable lens is generally used. In other words, in the design process, lenses are independent of each other. In the design process, the impact of each lens on the image quality is evaluated separately, and each lens is separately adjusted, to meet the final design requirements.

For existing design methods, a single lens has great impact on the image quality of the entire lens assembly, and much attention needs to be paid to single lenses. The larger the number of lenses is, the more complex the adjustment will be, making it more difficult to meet the high resolution requirements of the camera module. In the design process, the adjustment of a single lens may have great impact on the image quality of the entire lens assembly, for example, increase the sensitivity of the lens assembly. In contrast, when multiple lenses are used in cooperation, the lenses can compensate for each other, so that a lens assembly with high image quality can be obtained by using lenses whose quality is not high. This aspect is entirely not considered in existing design methods.

Further, the designed lens assembly needs to be used in practical production. In existing design methods, every lens needs to be produced according to design requirements, and during the assembly process, the error introduced during the assembly of each lens will affect the final image quality of the lens assembly. The larger the number of lenses is, the heavier the yield loss of the lens assembly caused by component tolerances and limited assembly precision will be.

SUMMARY

An advantage of the present disclosure is to provide a method for compensating for image quality of an optical system by means of a lens adjustment or a lens set adjustment, which is based on a module design having an adjustable lens, lens set or lens assembly. During the module production process, by determining the image quality, the adjustment amount and the adjustment mode for lenses are quantitatively calculated, so that an adjustment can be performed rapidly and accurately to compensate for the image quality of the camera module.

An advantage of the present disclosure is to provide a method for compensating for image quality of an optical system by means of a lens adjustment, which can determine main parameters of the image quality, for example, an image plane inclination, field curvature, and a peak, establish functions of relation between the parameters and lens sensitivity, calculate a target movement position of the to-be-adjusted lens, and adjust the lens. In this way, the lens can be adjusted in a targeted manner, and the adjustment can be completed down to one time, thereby achieving high efficiency, high precision, and high quality.

An advantage of the present disclosure is to provide a method for compensating for image quality of an optical system by means of a lens adjustment, which can improve the uniformity of the module resolution at four corners of the image, and by directionally adjusting eccentricity and inclination of the lens or lens set in real time, can compensate for the decrease in the image quality of the module due to the image plane inclination and field curvature caused by other components and assembly inclination, thereby ensuring the image quality of the module.

An advantage of the present disclosure is to provide a method for compensating for image quality of an optical system by means of a lens adjustment. The module manufacturer does not need to purchase whole lens modules and only needs to purchase single lenses. Therefore, labor costs and the performance and yield loss of the lens assembly caused by the assembly of lenses in the lens assembly manufacturer are reduced, thereby further reducing the module production costs.

An advantage of the present disclosure is to provide a method for compensating for image quality of an optical system by means of a lens adjustment, where because the image plane inclination is compensated for by means of a lens or lens set adjustment, the requirements on the tolerances of other components and the module packaging process can be lowered, thereby improving the component and process yields, and reducing the costs.

An advantage of the present disclosure is to provide a method for compensating for image quality of an optical system by means of a lens adjustment, where an adjustment amount required by the lens or the lens set is calculated based on the image plane inclination of the system and the sensitivity of lens spacing design, the field curvature is corrected by using the adjustment amount, so as to solve the defect that the image quality is affected by the tolerance introduced in the manufacturing of the lens or lens set and the field curvature that occurs during imaging of the optical system after assembly, thereby lowering the requirements on the quality of the lenses, making the purchase of the lenses more convenient, and reducing the costs.

An advantage of the present disclosure is to provide a method for compensating for image quality of an optical system by means of a lens adjustment, where because the image quality of the module is compensated for by means of a lens or lens set adjustment, the module focusing step is omitted, so that the production process is simplified, and the production efficiency of the camera module can be improved, thereby meeting the demand of development of high efficient production.

An advantage of the present disclosure is to provide a method for compensating for image quality of an optical system by means of a lens adjustment, where imaging information needs to be collected so as to output image plane inclination, field curvature and peak information of the required image quality, and the chart is not limited, and may be a two-dimensional chart or a three-dimensional chart as long as the chart can output image information, thereby making the implementation easier and more convenient, achieving high practicability.

An advantage of the present disclosure is to provide a method for compensating for image quality of an optical system by means of a lens adjustment, where the lenses or lens sets can be assembled directly in module assembly and production, without relying on conventional raw material production methods, and the product yield can be increased by adjusting the optical and mechanical deviations during assembly and production, thereby achieving high efficient production of high-quality modules.

An advantage of the present disclosure is to provide a method for compensating for image quality of an optical system by means of a lens adjustment, where an eccentricity amount, an inclination angle and lens spacing to be adjusted for the lens or lens set are calculated based on the inclination of the image planes relative to each other, and finally the image plane inclination is corrected by decreasing the inclination angle, thereby ensuring the image quality of the camera module.

An advantage of the present disclosure is to provide a method for compensating for image quality of an optical system by means of a lens adjustment, where a function is established based on the sensitivity of the lens assembly, and an optimal adjustment amount is calculated by batch computing of a computer, so that the lens or lens set to be adjusted can be calibrated quickly and conveniently in a targeted manner, thereby improving the production efficiency of the camera module and ensuring the product yield.

An advantage of the present disclosure is to provide a method for compensating for image quality of an optical system by means of a lens adjustment, where respective adjustment amounts of lenses or lens sets to be adjusted are calculated automatically by using a computer, and the calculation results are accurate, making the adjustments of the lenses or lens sets more accurate, thereby ensuring the image quality of the camera module.

An advantage of the present disclosure is to provide a method for designing an optical lens assembly and an lens assembly manufactured by using same, where in the optical lens assembly design process, the lens unit is taken as the start point of design, and tolerance allocation is performed for the lens or lens set that can be adjusted in real time, so that its sensitivity can compensate for the loss of image quality caused by other lenses and during the assembly process.

An advantage of the present disclosure is to provide a method for designing an optical lens assembly and a lens assembly manufactured by using same, where multiple lenses are divided into at least two lens units, so that the design object changes from a large number of single lenses to a small number of lens units.

An advantage of the present disclosure is to provide a method for designing an optical lens assembly and a lens assembly manufactured by using same, where in the optical lens assembly design process, the sensitivity of the lenses is balanced.

An advantage of the present disclosure is to provide a method for designing an optical lens assembly and an lens assembly manufactured by using same, where in the optical lens assembly design process, the sensitivity of each lens in the lens unit is compensated for and balanced so that the adjustment of the lens unit meets the requirements on the image quality of the entire lens assembly, and the adjustment is not performed on the sensitivity of a single lens.

An advantage of the present disclosure is to provide a method for designing an optical lens assembly and an lens assembly manufactured by using same, where in the optical lens assembly design process, the air spacing between the lens units is designed, so that the air spacing between the lens units cooperates to meet the design requirements of the optical lens assembly.

An advantage of the present disclosure is to provide a method for designing an optical lens assembly and an lens assembly manufactured by using same, where the lens assembly manufactured by using the design method can be assembled and adjusted on a per-unit basis, thereby overcoming the limitation of the accumulated component tolerance and the assembly precision, and improving the production yield of the optical lens assembly.

An advantage of the present disclosure is to provide a method for designing an optical lens assembly and a lens assembly manufactured by using same, where at least one of the lens units in the optical lens assembly is an adjustable unit, so that the adjustment can be performed on a per-unit basis.

An advantage of the present disclosure is to provide a method for designing an optical lens assembly and a lens assembly manufactured by using same, where an optical lens assembly designed by using the design method is suitable for use in a high-resolution camera module.

An advantage of the present disclosure is to provide a method for designing an optical lens assembly and a lens assembly, which can solve the problem of high sensitivity of conventional lens assemblies that need to meet requirements such as high resolution, a large aperture, and a small thickness.

To achieve the above-mentioned advantages of the present disclosure or other objectives and advantages of the present disclosure, the present disclosure provides a method for compensating for image quality of an optical system by means of a lens adjustment, applicable to a camera module comprising an adjustable lens or an adjustable lens set, the method comprising the following steps:

(A) determining, based on imaging information of a to-be-adjusted optical system, parameters that need to be adjusted for compensating for the image quality;

(B) establishing functions of relation between the parameters that need to be adjusted for compensating for the image quality and to-be-adjusted lens factors; and (C) determining an adjustment mode and an adjustment amount for the to-be-adjusted lens based on the relation between the parameters that need to be adjusted for compensating for the image quality and the to-be-adjusted lens factors.

According to an embodiment of the present disclosure, the step (A) comprises the following steps: (A1) collecting imaging information from a preset chart by using the to-be-adjusted optical system; (A2) calculating parameters representing the image quality based on the collected imaging information; and (A3) comparing the parameters representing the image quality with preset resolution requirements, and determining that the parameters that need to be adjusted in the to-be-adjusted optical system is one or more of an image plane inclination, field curvature, and a peak.

According to an embodiment of the present disclosure, the step (B) comprises the following steps: (B1) establishing a function of relation between an image plane inclination and the to-be-adjusted lens factors; (B2) establishing a function of relation between field curvature and the to-be-adjusted lens factors; (B3) establishing a function of relation between a peak and the to-be-adjusted lens factors; and (B4) establishing a function of relation between the image quality and the to-be-adjusted lens factors.

According to an embodiment of the present disclosure, the functions of relation between the image plane inclination, the field curvature, the peak, and the to-be-adjusted lens factors are respectively:

$$T(d,t)=f\{d(x,y),t(x,y)\}, d(x,y)=d(k*\cos(\theta),k*\sin(\theta));$$

$$C(h,g,r)=f\{h(z),g(z),r(z)\}; \text{ and}$$

$$P(d,h,r,t)=f\{(d(x,y),h(z),r(z),t(x,y)\};$$

wherein T represents the image plane inclination, C represents the field curvature, P represents the peak, d represents lens eccentricity, t represents a lens inclination, h represents a lens thickness, g represents lens spacing, r represents lens surface precision, x and y are direction coordinates decomposed in an image plane perpendicular to an optical axis, z is a direction coordinate along the optical axis, θ is an angular coordinate in a two-dimensional plane defined by x and y, and k is an absolute value of eccentricity.

According to an embodiment of the present disclosure, the functions between the image plane inclination, the field curvature, the peak, and the to-be-adjusted lens factors are established based on lens assembly sensitivity.

According to an embodiment of the present disclosure, the image plane inclination, the field curvature, and the peak are calculated by using a defocusing curve or other calculation methods suitable for quantizing the image plane inclination, the field curvature, and the peak.

According to an embodiment of the present disclosure, in the above-mentioned method, the image plane inclination, the field curvature, and the peak are factors affecting the image quality, and the image quality is expressed as a function of the image plane inclination, the field curvature, and the peak:

$$F(T,C,P)=f\{T(d,t),C(h,g,r),P(d,h,r,t)\}.$$

According to an embodiment of the present disclosure, in the above-mentioned method, the function of relation between the image quality of the optical system and the to-be-adjusted lens factors is:

$$F(T,C,P)=f''\{f\{d(k*\cos(\theta),k*\sin(\theta)),t(x,y)\},\{h(z),g(z),r(z)\},f\{(d(x,y),h(z),r(z),t(x,y)\}\}.$$

According to an embodiment of the present disclosure, in the function of relation between the image quality of the optical system and the to-be-adjusted lens factors, r is lens surface precision, and when the peak needs to be adjusted, the lens eccentricity d, the lens thickness h, and the lens inclination t need to be calculated and adjusted, and the lens surface precision r does not need to be adjusted.

According to an embodiment of the present disclosure, in the above-mentioned method, x, y, z, and θ of a target movement position of the to-be-adjusted lens are calculated, a solution of the equation corresponding to an optimal F(T, C, P) is solved.

In the above-mentioned method, the chart used in the step of collecting imaging information is a chart suitable for outputting image information, and is a two-dimensional chart or a three-dimensional chart.

In the above-mentioned method, the imaging information is collected using a moving chart or a moving module.

In the above-mentioned method, in the above-mentioned method, the image quality of the optical system comprises one or more of the following evaluation methods representing the resolution of an imaging system: an optical transfer function, a modulation transfer function, a spatial frequency response, a contrast transfer function, or a TV line.

According to an embodiment of the present disclosure, before the step (A), the above-mentioned method further comprises a step of electrifying the camera module comprising the adjustable lens or the adjustable lens set to collect imaging formation of the camera module.

According to an embodiment of the present disclosure, in the above-mentioned method, the adjustable lens or the adjustable lens set comprised in the camera module is preassembled in the camera module, and the spatial position of the adjustable lens or the adjustable lens set relative to the camera module is adjustable in at least one direction.

To achieve at least one of the objectives of the present disclosure, an aspect of the present disclosure provides method for designing an optical lens assembly, comprising the following steps:

(a) selecting lenses according to predetermined criteria;

(b) dividing the lenses into at least two lens units; and (c) determining, based on imaging information, lens parameters that need to be adjusted, and adjusting the lens parameters on a per-lens unit basis, so that the optical lens assembly satisfies predetermined criteria and image quality requirements.

According to some embodiments, in the method for designing an optical lens assembly, in the step (b), a suitable lens unit division option is selected for the optical lens assembly from multiple lens unit division options according to the predetermined criteria and the image quality.

According to some embodiments, in the method for designing an optical lens assembly, in the step (c), a basic variable and an auxiliary variable are set in advance, and during the adjustment process, the basic variable remains substantially unchanged, and the auxiliary variable is adjusted.

According to some embodiments, in the method for designing an optical lens assembly, air spacing between the lens units is main air spacing, and the basic variable is the main air spacing.

According to some embodiments, in the method for designing an optical lens assembly, the basic variable is sensitivity of the optical lens assembly.

According to some embodiments, in the method for designing an optical lens assembly, the step (c) comprises a step of adjusting the lenses in the lens units for mutual compensation.

According to some embodiments, in the method for designing an optical lens assembly, at least one of the lens units is an adjustable unit.

According to some embodiments, in the method for designing an optical lens assembly, at least one of the lens units comprises at least two lenses.

Another aspect of the present disclosure provides an optical lens assembly, comprising at least two lens units, wherein the lens units cooperate with each other.

According to some embodiments, the lens units in the optical lens assembly are obtained by using the design method described above.

Another aspect of the present disclosure provides a method for manufacturing an optical lens assembly, the optical lens assembly is manufactured by using the design method described above.

DETAILED DESCRIPTION OF EMBODIMENTS

The following description is used for disclosing the present disclosure to enable those skilled in the art to implement the present disclosure. In the following description, preferred embodiments are provided by way of example only, and those skilled in the art may easily conceive of other variations. The basic principle of the present disclosure defined in the following description applies to other implementation solutions, variant solutions, improved solutions, equivalent solutions and other technical solutions that do not depart from the spirit and scope of the present disclosure.

Figure 1:
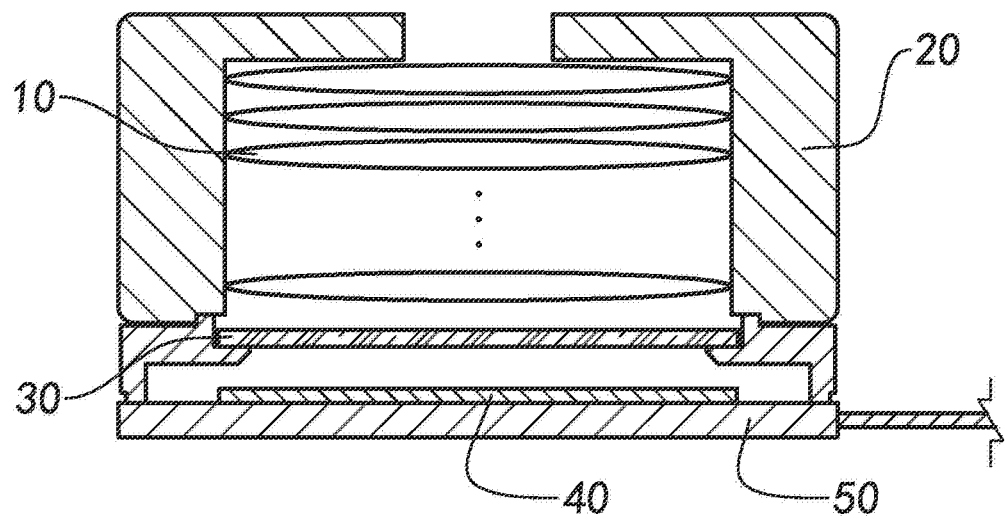
FIG. 1 is a schematic structural diagram of a camera module comprising an adjustable lens according to a preferred embodiment of the present disclosure.

Referring to FIG. 1, a camera module comprises multiple lenses 10, an optical structure component 20, a filter 30, a photosensitive chip 40, a circuit board 50, and other related components. The lenses 10 are assembled inside the optical structure component 20 along the height direction of the optical structure component 20, and are located on a light sensing path of the photosensitive chip 40. The filter 30 is also mounted inside the optical structure component 20, and is located below the lens 10 and above the photosensitive chip 40, and is located on the light sensing path of the photosensitive chip 40. The photosensitive chip 40 is adhered above the circuit board 50. The above-mentioned elements are assembled and fixed to form the camera module. In the lens-adjustable camera module, at least one of the lenses 10 is an adjustable lens, and the adjustable lens is adapted to be adjusted within the space inside the optical structure component 20. That is to say, the adjustable lens is preassembled in the camera module, and the adjustable lens is not fixed, so that the adjustable lens can be adjusted. After the adjustable lens is adjusted, the central axis of the adjustable lens and the central axis of the photosensitive chip 40 coincide or fall within a permitted deviation range, so that imaging of the camera module meets the resolution requirements. Then, the preassembled adjustable lens is fixed. That is, the adjustment of the camera module is completed in the production and assembly process of the camera module, to improve the image quality of the camera module.

The present disclosure is a method for implementing the adjustment of the image quality in the module production process by means of a lens adjustment. In addition, the adjustable lens may also be implemented as an adjustable lens set or an adjustable optical lens assembly in a camera module using a split lens assembly, both of which can be adjusted by using the method of the present disclosure for compensating for the image quality.

Figure 2A:
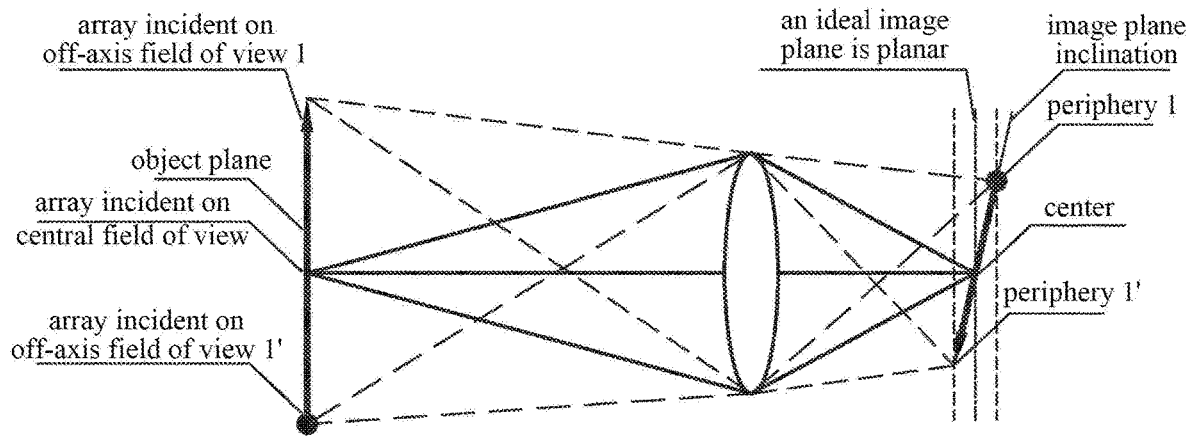
FIG. 2A to FIG. 2C are schematic diagrams illustrating a phenomenon of low image quality of the camera module due to an image plane inclination according to the above-mentioned preferred embodiment of the present disclosure.
Figure 2B:
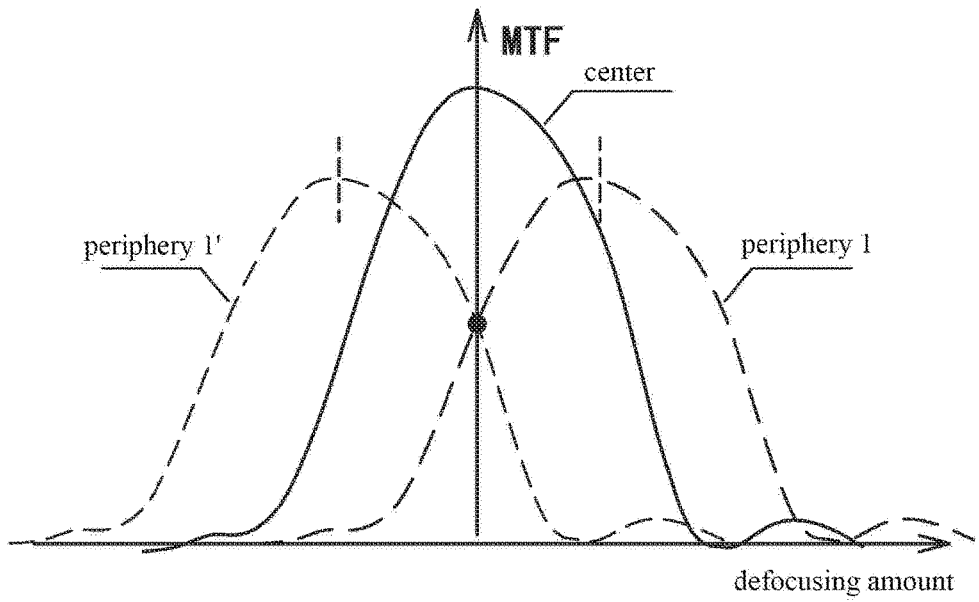
Figure 2C:
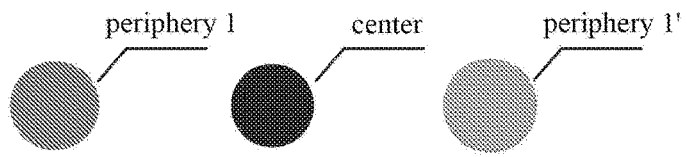
Figure 3A:
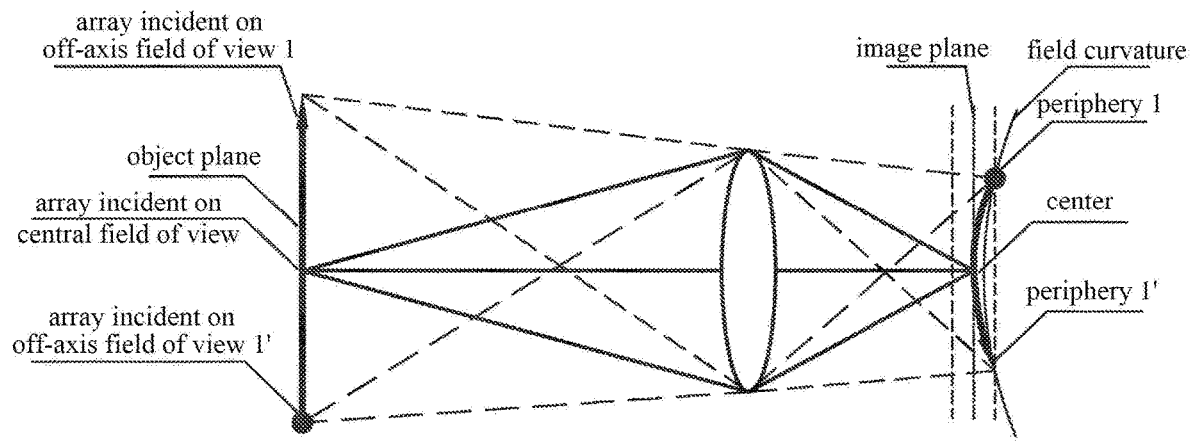
FIG. 3A to FIG. 3C are schematic diagrams illustrating a phenomenon of low image quality of the camera module due to field curvature according to the above-mentioned preferred embodiment of the present disclosure.
Figure 3B:
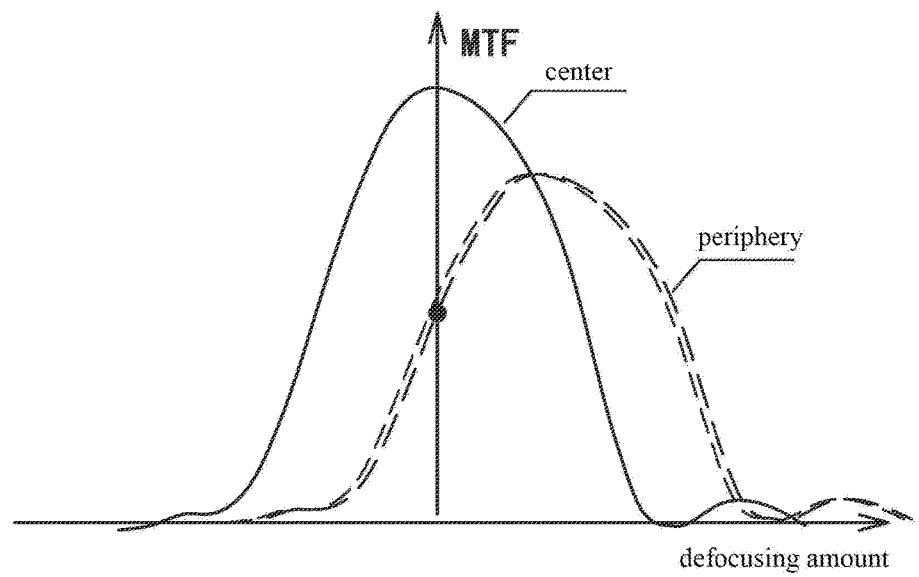
Figure 3C:
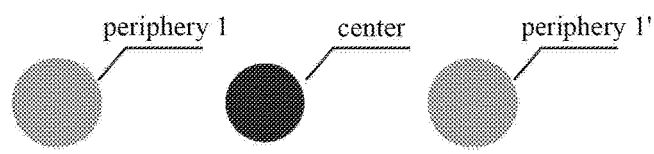
Figure 4A:
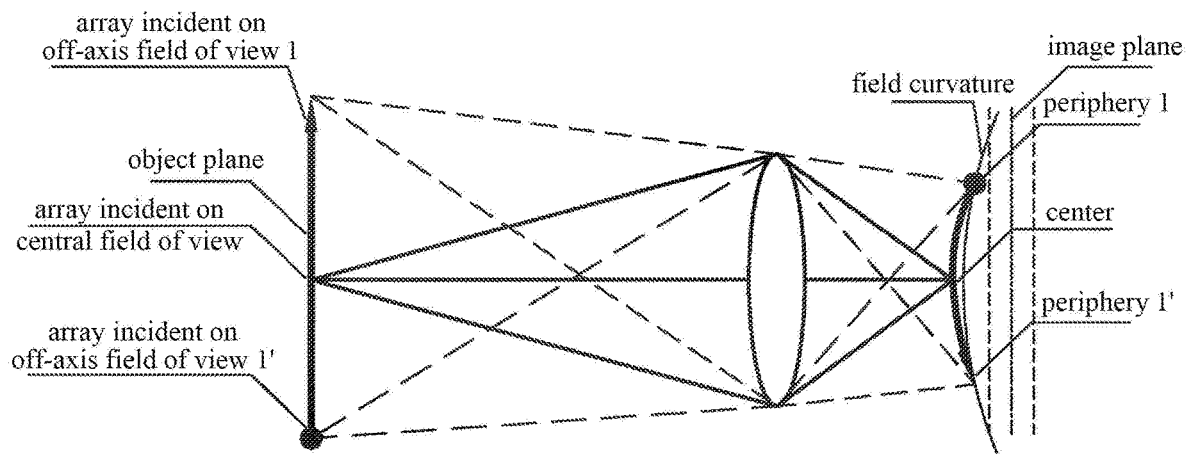
FIG. 4A to FIG. 4C are schematic diagrams illustrating a phenomenon of low image quality of the camera module due to a peak according to the above-mentioned preferred embodiment of the present disclosure.
Figure 4B:
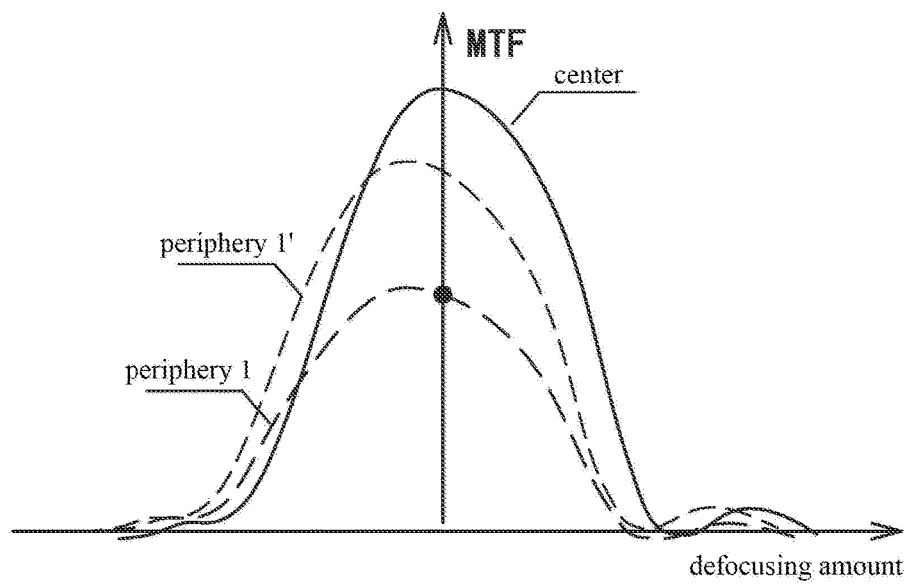
Figure 4C:
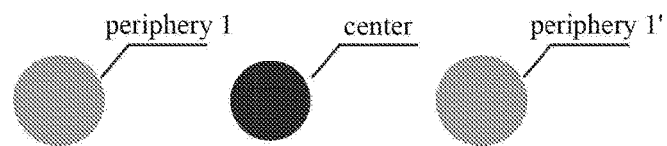

The main manifestation of the image quality of the optical system may be eventually decomposed into three factors, namely, an image plane inclination, field curvature, and a peak, any of which may lead to a decrease in the image quality. A general manifestation of a decrease in the image quality due to the three factors is as shown in FIG. 2A to FIG. 4C. FIG. 2A, FIG. 2B and FIG. 2C are schematic diagrams illustrating a phenomenon of low image quality of the camera module due to an image plane inclination. Because an ideal image plane is planar but the actual image plane is inclined relative to the ideal image plane, the definition at the periphery of the image is not uniform. FIG. 3A, FIG. 3B and FIG. 3C are schematic diagrams illustrating a phenomenon of low image quality of the camera module due to field curvature. FIG. 4A, FIG. 4B and FIG. 4C are schematic diagrams illustrating a phenomenon of low image quality of the camera module due to a peak.

In the present disclosure, on the basis of the above-mentioned camera module design comprising the adjustable lens or lens set or lens assembly, the image quality is determined, and an adjustment amount can be calculated for a to-be-adjusted lens based on the functions of relation between the lens sensitivity and main parameters of the image quality, comprising the image plane inclination, the field curvature, and the peak, thereby achieving efficient production of high-quality camera modules having high image quality at low costs.

Specifically, after the preassembly of the camera module comprising the adjustable lens is completed, imaging of the camera module is collected, an adjustment amount is calculated for the adjustable lens based on the imaging of the camera module by using software, and then the adjustable lens is adjusted according to the adjustment amount, until the imaging of the camera module meets the resolution requirements. Then the adjusted adjustable lens is packaged and fixed, thus completing the production and assembly of the camera module. For example, but not limiting of, the imaging of the camera module is collected by electrifying the camera module, or a defocusing curve is collected by using a moving chart.

Figure 5A:
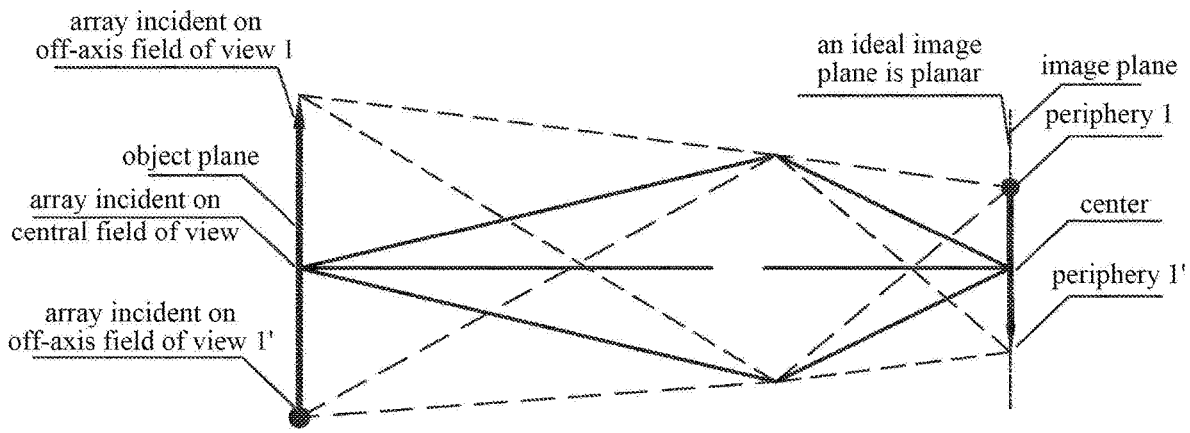
FIG. 5A to FIG. 5C are schematic diagrams illustrating an effect of optical image quality compensation achieved by adjusting an adjustable lens in the camera module according to the above-mentioned preferred embodiment of the present disclosure.
Figure 5B:
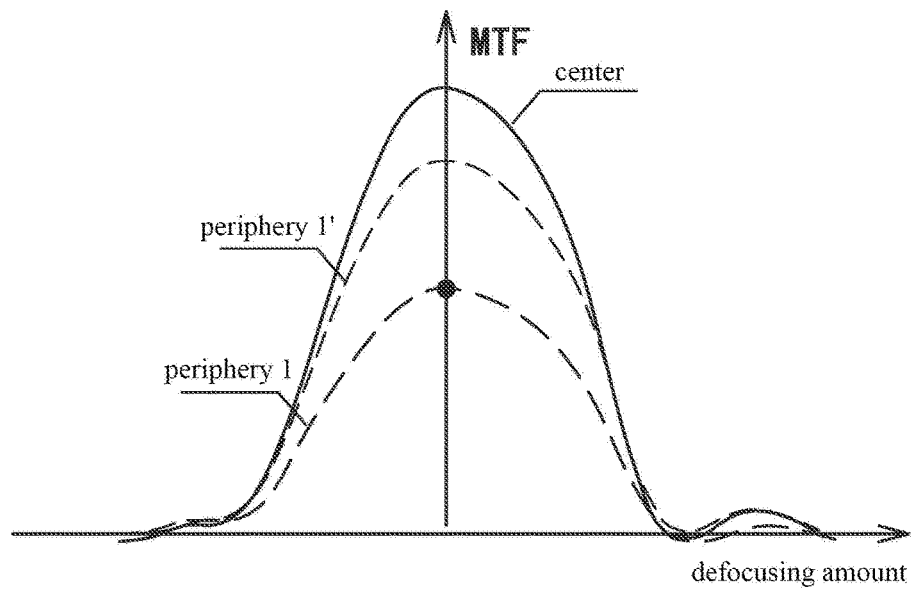
Figure 5C:
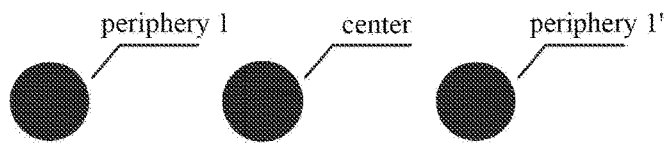

In the method for compensating for image quality of an optical system according to the present disclosure, imaging of the camera module is collected, the imaging of the camera module is analyzed by using an optical method, functions of relation between factors affecting the image quality and the sensitivity of each adjustable lens are established, and the adjustment amount of the adjustable lens (or referred to as the to-be-adjusted lens) is quantitatively calculated, so that in a subsequent adjustment, the adjustable lens can be adjusted to its assembly position at a time, thereby ensuring the precision of the adjustment and improving the production efficiency. FIG. 5A, FIG. 5B and FIG. 5C are schematic diagrams illustrating an effect of optical image quality compensation achieved by adjusting an adjustable lens in the in the method for compensating for image quality of an optical system according to the present disclosure.

Figure 6:
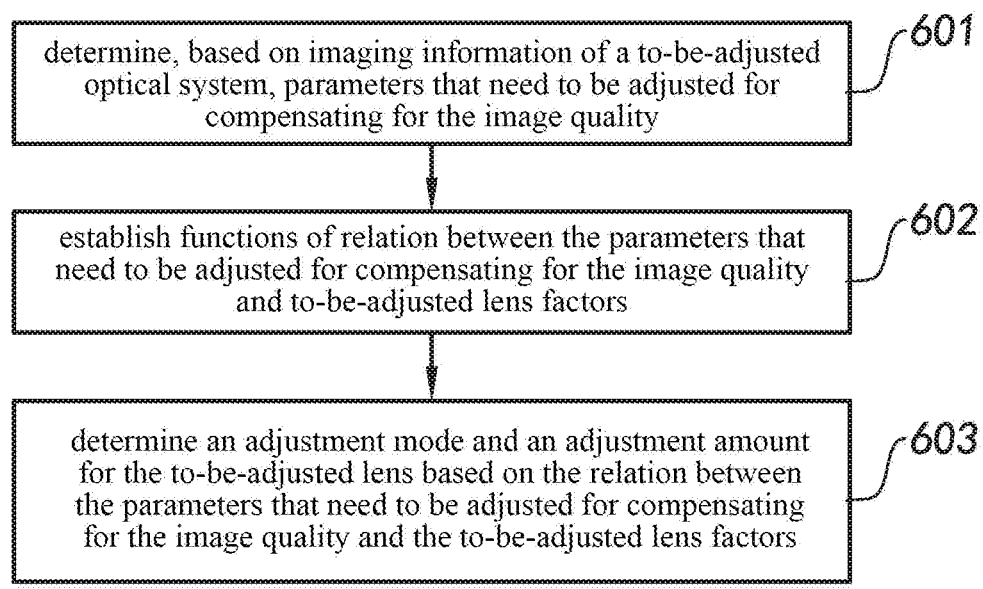
FIG. 6 is a flow chart of a method for compensating for image quality of an optical system according to the above-mentioned preferred embodiment of the present disclosure.

Referring to FIG. 6, a flow chart of a method for compensating for image quality of an optical system according to the present disclosure is illustrated. As shown in FIG. 6, the method 600 for compensating for image quality of an optical system comprises the following steps:

step (601): determining, based on imaging information of a to-be-adjusted optical system, parameters that need to be adjusted for compensating for the image quality;

step (602): establishing functions of relation between the parameters that need to be adjusted for compensating for the image quality and to-be-adjusted lens factors; and step (603): determining an adjustment mode and an adjustment amount for the to-be-adjusted lens based on the relation between the parameters that need to be adjusted for compensating for the image quality and the to-be-adjusted lens factors.

Because the factors affecting the image quality comprise an image plane inclination, field curvature and a peak, it is determined in the step (601), by analyzing the imaging information, that factors affecting the image quality of the camera module to be calibrated comprise which one or more of the image plane inclination T, the field curvature C and the peak P, and further to-be-adjusted parameters of the image quality of the camera module to be calibrated is determined.

The image quality mentioned herein comprises an optical transfer function (OTF), a modulation transfer function (MTF), a spatial frequency response (SFR), a contrast transfer function (CTF), a TV line and any other evaluation method that can represent the resolution of an imaging system.

The image quality may be represented as a function of the image plane inclination, the field curvature, and the peak. Therefore, the image quality can be defined as:

$$F(T,C,P)=f\{T(d,t),C(h,g,r),P(d,h,r,t)\}$$

where F represents the image quality, T represents the image plane inclination, C represents the field curvature, P represents the peak, d represents lens eccentricity, t represents a lens inclination, h represents a lens thickness, g represents lens spacing, and r represents lens surface precision.

Figure 7:
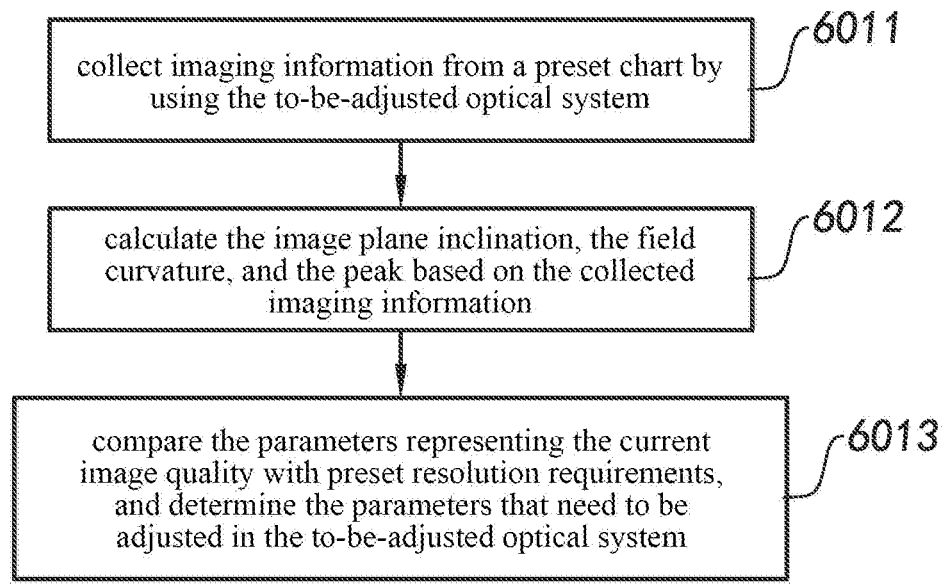
FIG. 7 is a flow chart of a method for determining to-be-adjusted parameters of the image quality in the process of compensating for the image quality of the optical system according to the above-mentioned preferred embodiment of the present disclosure.

As shown in FIG. 7, a method for determining to-be-adjusted parameters of the image quality based on the imaging information comprises the following steps:

step (6011): collecting imaging information from a preset chart by using the to-be-adjusted optical system;

step (6012): calculating parameters that can represent the image quality, comprising the image plane inclination T, the field curvature C, and the peak P, based on the collected imaging information; and step (6013): comparing the parameters representing current image quality with preset resolution requirements, and determining that the parameters that need to be adjusted in the to-be-adjusted optical system is one or more of T, C, and P.

In the step (6011), the imaging information is collected, to output information about the required image plane inclination T, field curvature C, and peak P. In the present disclosure, the imaging of the camera module may be collected by shooting a CTF or SFR test chart with the camera module. A CTF or SFR value is used to represent the image quality of the module. Collecting imaging information may also be performed based on other test charts, as long as the image quality can be represented. Collecting imaging information based on a CTF or SFR chart should not be considered as a limitation on the present disclosure, and those skilled in the art can conceive of the use of other charts for collecting imaging information.

In addition, the chart used in the step of collecting imaging information is not limited, and may be a two-dimensional chart or a three-dimensional chart. Any chart capable of outputting image information can be applied to the present disclosure.

It should be noted that the process used for collecting the imaging information is not limited in the present disclosure. Any process may be used as long as the required information can be collected, and the imaging information may be collected by using a moving chart or a moving module.

In the step (6012) and the step (6013), according to the present disclosure, the image plane inclination T, the field curvature C, and the peak P are calculated based on the collected imaging information. For example, in a preferred embodiment, T, C, and P are calculated by using a defocusing curve, and then decomposed onto the to-be-adjusted lens set, to determine to-be-adjusted parameters of the to-be-adjusted lens.

It should be noted that the method with which T, C, and P are calculated is not limited in the present disclosure, and any method that can quantitatively the image plane inclination T, the field curvature C, and the peak P may be used for calculation, comprising, but not limited to, the method of using a defocusing curve. Based on the optical design and calibration idea of the present disclosure, those skilled in the art may conceive of other methods for calculating T, C, and P. Therefore, other methods for calculating T, C, and P can also be applied to the present disclosure.

It should be noted that in the step (602), after the information about the image plane inclination T, the field curvature C, and the peak P is acquired, functions between the parameters and the sensitivity of the to-be-adjusted lens need to be established before performing decomposition of the factors such as lens eccentricity, an inclination, a thickness and spacing. This needs to be established with reference to the sensitivity of the optical design of the camera module.

Figure 8:
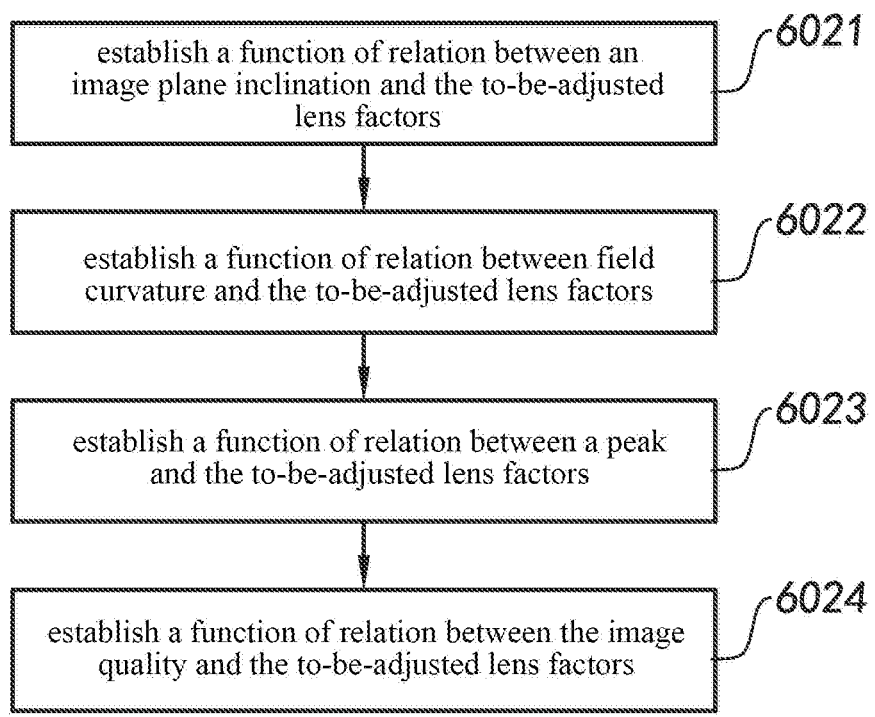
FIG. 8 is a flow chart of a method for establishing functions of relation between parameters for adjusting the image quality and to-be-adjusted lens factors in the process of compensating for the image quality of the camera module of the optical system according to the above-mentioned preferred embodiment of the present disclosure.

As shown in FIG. 8, in the step (602), a method for establishing functions of relation between to-be-adjusted parameters of the image quality and the to-be-adjusted lens factors comprises the following steps:

step (6021): establishing a function of relation between an image plane inclination and the to-be-adjusted lens factors;

step (6022): establishing a function of relation between field curvature and the to-be-adjusted lens factors;

step (6023): establishing a function of relation between a peak and the to-be-adjusted lens factors; and step (6024): establishing a function of relation between the image quality and the to-be-adjusted lens factors.

In the step (6021), with reference to the optical design theory of the module, the image plane inclination T is a function of the lens eccentricity d and the lens inclination t, and the function of relation between the image plane inclination T and the to-be-adjusted lens factors may be expressed as:

$$T(d,t)=f\{d(x,y),t(x,y)\}, d(x,y)=d(k^*\cos(\theta),k^*\sin(\theta))$$

In this function, x and y are direction coordinates decomposed in an image plane perpendicular to an optical axis, $\theta$ is an angular coordinate in a two-dimensional plane defined by x and y, and k is an absolute value of eccentricity.

This function is determined by the sensitivity of the optical design of the lens assembly. Therefore, an image plane inclination function can be established based on the sensitivity of the lens assembly.

In the step (6022), the field curvature C is a function of the lens thickness h, and the lens spacing g, and the function of relation between the field curvature C and the to-be-adjusted lens factors may be expressed as:

$$C(h,g,r)=f\{h(z),g(z),r(z)\}$$

In this function, z is a direction coordinate along the optical axis.

This function is determined by the sensitivity of the optical design of the lens assembly. Therefore, a field curvature function can be established based on the sensitivity of the lens assembly.

In the step (6023), the peak P is a function of the lens eccentricity d, the lens thickness h, the lens surface precision r and the lens inclination t, and the function of relation between the peak P and the to-be-adjusted lens factors may be expressed as:

$$P(d,h,r,t)=f\{(d(x,y),h(z),r(z),t(x,y)\}$$

In this function, x and y are direction coordinates decomposed in an image plane perpendicular to an optical axis, z is a direction coordinate along the optical axis, and r is lens surface precision, where r cannot be changed by adjusting the mechanical position of the lens. That is to say, when the peak P needs to be adjusted, the lens eccentricity d, the lens thickness h, and the lens inclination t need to be calculated. After the calculation, the lens eccentricity d, the lens thickness h, and the lens inclination t need to be adjusted properly while considering the impact of the lens surface precision r on the peak, but the lens surface precision r does not need to be adjusted.

This function is also established based on the sensitivity of the lens assembly.

In the step (6024), according to the step (6021) to the step (6023), a function of relation between the image quality and the to-be-adjusted lens factors may be established.

The image quality may be represented as a function of the image plane inclination T, the field curvature C, and the peak P, and the function of relation between the image quality and the to-be-adjusted lens factors may be expressed as:

$$F(T,C,P)=f''\{f\{d(x,y),t(x,y)\},\{h(z),g(z),r(z)\},f\{(d(x,y),h(z),r(z),t(x,y)\}\},$$

which may be further converted into:

$$F(T,C,P)=f''\{f\{d(k^*\cos(\theta),k^*\sin(\theta)),t(x,y)\},\{h(z),g(z),r(z)\},f\{(d(x,y),h(z),r(z),t(x,y)\}\};$$

In this function, F represents the image quality, T represents the image plane inclination, C represents the field curvature, and P represents the peak. d represents lens eccentricity, t represents a lens inclination, h represents a lens thickness, g represents lens spacing, r represents lens surface precision, x and y are direction coordinates decomposed in an image plane perpendicular to an optical axis, z is a direction coordinate along the optical axis, $\theta$ is an angular coordinate in a two-dimensional plane defined by x and y, and k is an absolute value of eccentricity.

In the step (603), the adjustment mode and the adjustment amount of the to-be-adjusted lens are determined based on the function of relation between the image quality and the to-be-adjusted lens factors in the step (6024). That is, based on the relation between F(T, C, P), x, y, z, and θ, after the adjustment target is determined from the image plane inclination T, the field curvature C and/or the peak P, a solution of the equation corresponding to an optimal F(T, C, P), that is, the values of x, y, z, and θ of the target movement position of the to-be-adjusted lens, may be solved by means of automatic computing of a computer. That is, when the image quality is optimal, the values of x, y, z, and θ of the target movement position of the to-be-adjusted lens are calculated by using software, and the to-be-adjusted lens is moved in a targeted manner based on the calculated target movement position of the to-be-adjusted lens, i.e., the horizontal direction, vertical direction, inclination direction and circumferential direction of the to-be-adjusted lens are quantitatively adjusted. In this way, the to-be-adjusted lens can be calibrated in a targeted manner, to compensate for the image quality in the camera module production process quickly, to compensate for the decrease in the image quality of the module due to the image plane inclination, the field curvature and the peak caused by other components and the assembly inclination. After the to-be-adjusted lens is adjusted, the to-be-adjusted lens that meets the requirements after the adjustment is then fixed, and packaged into the entire camera module, to obtain a camera module whose image quality meets the requirements.

The method provided in the present disclosure can compensate for the image quality of the module in the module production process, so that the camera module produced can meet the expected resolution requirements. Therefore, the method of the present disclosure omits the focusing step, thereby improving the production efficiency of the camera module, ensuring the product yield, and reducing the production costs.

The design of an optical lens assembly is a complex process involving numerous variable factors that need to be considered. The numerous factors need to be balanced well to obtain an acceptable lens assembly. Therefore, not only the designers need to have good experience, but also it is necessary to provide a suitable design method to guide and help the designers to quickly and reasonably design a lens assembly that meets requirements and has high image quality. As described above, in conventional lens assembly design processes, a single lens is used as the design object, making the design of the lens assembly more complex, and leading to some design defects. For conventional designing methods that use a single lens as the object, lens assemblies that need to meet requirements such as high resolution, a large aperture, and a small thickness have high sensitivity, and there is a heavy yield loss of the lens assembly due to the tolerances of components and assembly precision. In contrast, the present disclosure provides a method for designing a lens assembly, where multiple lenses are grouped into at least two lens units, and the lens units are used as the object for an adjustment in the design process, so that the lens or lens set can be adjusted in real time to compensate for the image quality of the optical system. Further, the lenses in each lens unit can compensate for each other to meet the adjustment requirements together, for example, the sensitivity of the lenses in the lens unit is balanced. Further, performance loss such as an image plane inclination, curvature, and astigmatism caused by the lens tolerance and assembly error in conventional lens assemblies can be compensated for by adjusting the lens unit.

Further, in the design process, the lenses are grouped into at least two lens units, so that the original design with a large number of single lenses is changed to a design with a small number of lens units. Further, in the optical lens assembly design process, the sensitivity of the lenses is balanced. For example, in the optical lens assembly design process, the sensitivity of the lenses in the lens unit is compensated and balanced so that the adjustment of the lens unit meets the overall image quality requirements of the lens assembly, rather than adjusting the sensitivity of a single lens. Further, in the optical lens assembly design process, the air spacing between the lens units is designed, so that the spatial spacing between the lens units cooperates to meet the design requirements of the optical lens assembly. Further, in the design process, the lens unit can be translated in different directions, such as along the X, Y, or Z axis, or rotated by an angle, thereby compensating for the image quality of the optical system.

On the other hand, the method for designing an optical lens assembly of the present disclosure can be used for manufacturing the optical lens assembly. The lens assembly manufactured by using the method can be assembled and adjusted on a per-unit basis, thereby overcoming the limitation of the accumulated component tolerance and the assembly precision, and improving the production yield of the optical lens assembly. For example, after lenses are manufactured, the lenses may be grouped into lens units and fixed, and may further be mounted as lens units. Further, at least one of the lens units in the optical lens assembly may be an adjustable unit, so that an adjustment can be performed on a per-unit basis, rather than on a per-lens basis. The lens assembly designed by using the design method of the present disclosure uses the lens unit as the object of the design and adjustment, is suitable for use in a high-resolution camera module, and solves the problem of high sensitivity of conventional lens assemblies that need to meet requirements such as high resolution, a large aperture, and a small thickness.

Figure 9:
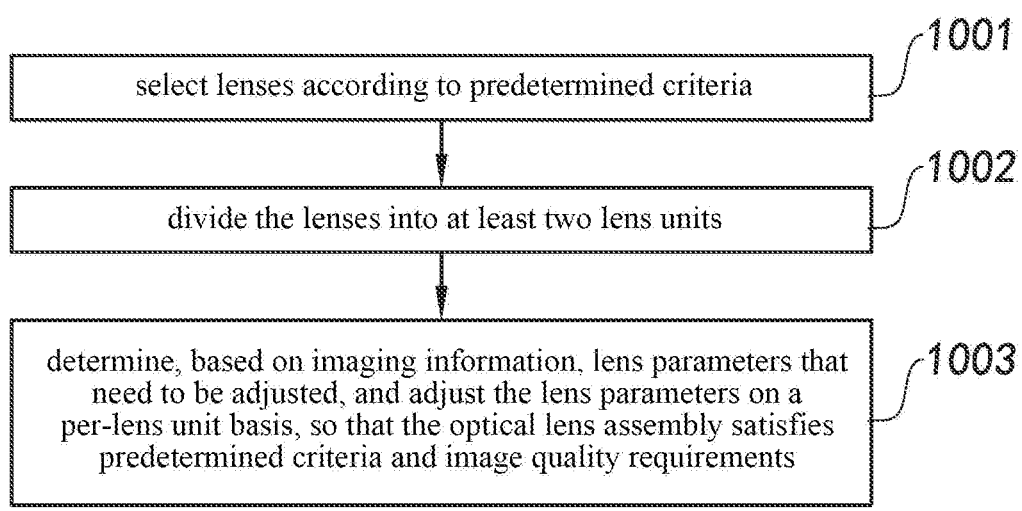
FIG. 9 is a block diagram of a method for designing a lens assembly according to a preferred embodiment of the present disclosure.

Referring to FIG. 9, a block diagram of a design method according to a preferred embodiment of the present disclosure is illustrated. The present disclosure provides a method for designing an optical lens assembly 1000. The design method 1000 comprises the following steps:

step 1001: selecting lenses according to predetermined criteria;

step 1002: dividing the lenses into at least two lens units; and step 1003: determining, based on imaging information, lens parameters that need to be adjusted, and adjusting the lens parameters on a per-lens unit basis, so that the optical lens assembly satisfies predetermined criteria and image quality requirements.

In the step 1001, the number of lenses and basic parameters that can be selected, for example, the basic surface form of the lens, may be determined preliminarily.

In the step 1002, the lenses may be divided into at least two lens units according to predetermined requirements. For example, the lens unit division option may be determined based on the imaging information of the optical lens assembly. Definitely, this process may be a repeated cycle, where the imaging information is observed while adjusting the lens, and the adjustment is performed repeatedly to finally determine the division option of the lenses. That is to say, the design object changes from a large number of single lenses to a small number of lens units, and the design target changes from a single lens to a lens unit. It should be noted that in the optical lens assembly consisting of multiple lenses, there may be multiple combinations of the lenses, and a suitable combination of lenses may be determined according to the predetermined criteria and image quality. That is to say, in the step 1002, a suitable lens unit division option is selected for the optical lens assembly from multiple lens unit division options of the lenses according to the predetermined criteria and the image quality.

In the step 1003, the object of the adjustment changes from a single lens to the lens unit, so as to comprise the impact of all the lenses, and the adjustment is not limited to the adjustment of one or more important lenses, for example, the first, second or last lens, thereby avoiding the limitation of the design. In addition, the lens units are adjusted in cooperation, thereby reducing the impact of a single lens on the entire optical lens assembly.

In the step 1003, the lens parameters comprise, for example, but not limited to, parameters such as an image height, a focal length, an aperture size, a total optical length, back focus, a field angle, distortion, relative illumination, a chief ray angle, a maximum image height, a contour dimension, a spatial spacing size, and sensitivity. Among the lens parameters, a basic variable may be determined firstly, with the rest being auxiliary variables. During the adjustment process, the basic variable may be set to meet a predetermined condition, and is not taken as the main object of the adjustment, and the auxiliary variables are adjusted. Definitely, after the auxiliary variables are adjusted, the basic variable may also be adjusted.

More specifically, the air spacing between the lens units may be defined as main air spacing. In one adjustment mode, the main air spacing may be used as the basic variable. After the basic variable is set to meet a predetermined condition, for example, set to be greater than or equal to a predetermined value, all the other auxiliary variables are adjusted. Definitely, the main air spacing may also be adjusted during the adjustment process, so that the optical lens assembly finally meets the predetermined requirements. For example, the basic parameters of the lens assembly satisfy predetermined specifications, the image quality meets the predetermined requirements, and a high yield is achieved. The method for determining the image quality is, for example, but not limited to, SFR.

In an adjustment mode of another implementation, the sensitivity of the optical lens assembly may be used as the basic variable. After the basic variable is set to meet a predetermined condition, all the other auxiliary variables are adjusted. Definitely, the sensitivity may also be adjusted, so that the image quality of the optical lens assembly finally meets the predetermined requirements.

Further, the step 1003 may further comprise the following step:

10031: adjusting the lenses in the lens units for mutual compensation. That is to say, in the adjustment process using a lens unit as the object, the lenses in the lens unit may be adjusted, so that the lenses compensate for each other to meet the requirements of the optical lens assembly on the lens unit.

Further, in the step 1003, at least one of the lens units may be set to be an adjustable unit. That is to say, at least one of the lens units can be adjusted during the assembly process.

Figure 10:
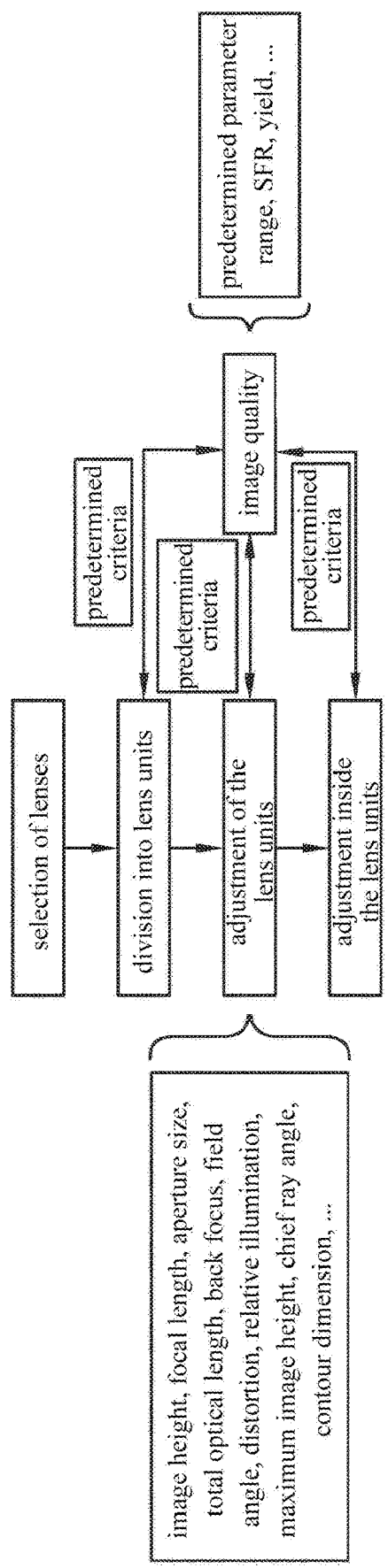
FIG. 10 is a schematic diagram of a lens assembly design process according to the above-mentioned preferred embodiment of the present disclosure.

Referring to FIG. 10, a schematic diagram of a design process according to the above-mentioned preferred embodiment of the present disclosure is illustrated. An optical lens assembly design process may be: firstly, selecting in advance lenses that satisfy a predetermined condition; repeatedly adjusting the lenses based on the imaging result, to determine the lens units of the optical lens assembly; and adjusting the lenses by using each lens unit as an object, so that the image quality of the optical lens assembly meets the predetermined requirements.

Further, an optical lens assembly reaching predetermined criteria is designed by using the above-mentioned method. The optical lens assembly is suitable for production. The process of manufacturing the optical lens assembly may be, for example, but not limited to: firstly, obtaining the lenses based on parameters of the lenses designed by using the method for designing an optical lens assembly, and then dividing the lenses into units; further, fixing the lenses that belong to a same lens unit; and further, assembling the lens units based on the design result by using each lens unit as an object, to obtain the optical lens assembly. The unit-based design can compensate for the image quality of the optical lens assembly by means of mutual cooperation of the units, and reduce the yield loss caused by a large accumulated component tolerance or assembly precision in the method of assembling single lenses, and is therefore more suitable for the requirements for high resolution, a large aperture, and a small thickness.

It should be noted that at least one of the lens units may be set to be an adjustable unit. That is to say, the position of the lens unit after being mounted can be adjusted, for example, can be translated along the X, Y, or Z axis or axially rotated by an angle, so that the optical lens assembly can be adjusted on a unit basis to have better image quality. That is to say, the unit-type design of the optical lens assembly and the assembly process of the optical lens assembly can cooperate with each other to provide better image quality.

Figure 11:
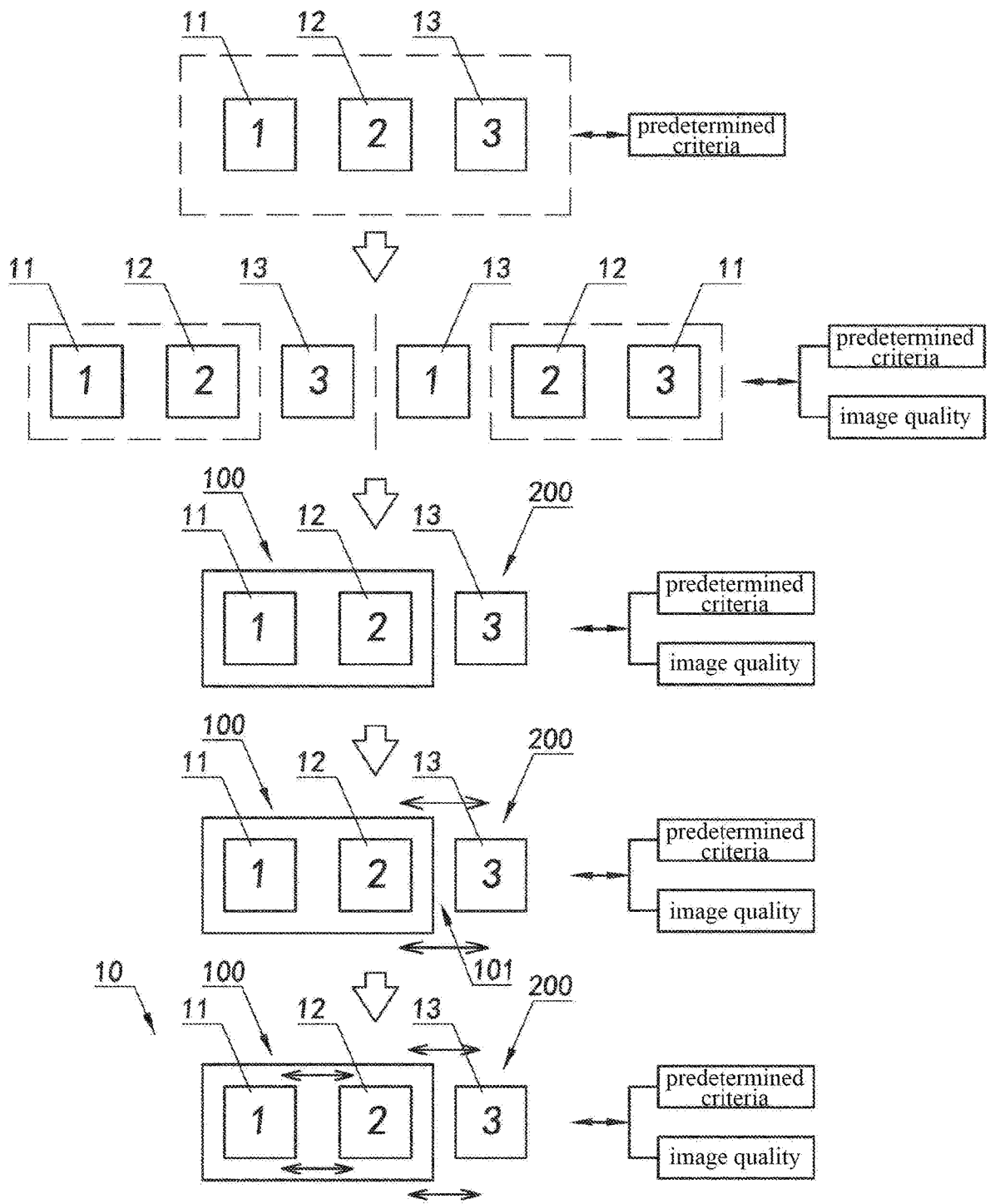
FIG. 11 is a schematic block diagram of a first implementation of an optical lens assembly according to the above-mentioned preferred embodiment of the present disclosure.

Referring to FIG. 11, a first implementation of an optical lens assembly according to the above-mentioned preferred embodiment of the present disclosure is illustrated. The present disclosure provides an optical lens assembly, which is manufactured by using the design method of the above-mentioned embodiment. The optical lens assembly 10 comprises three lenses, namely, a first lens 11, a second lens 12 and a third lens 13. The first lens 11 and the second lens 12 constitute a first lens unit 100, and the third lens 13 constitutes a second lens unit 200.

In the process of designing the optical lens assembly 10, firstly, three lens meeting requirements are selected in advance. Then the three lenses are divided into units. For example, it is finally determined, according to predetermined criteria of the design and image quality, that the first lens 11 and the second lens 12 constitute the first lens unit 100 and the third lens 13 constitutes the second lens unit 200. Further, according to the predetermined criteria and image quality, the first lens unit 100 and the second lens unit 200 are adjusted, so that the first lens unit 100 and the second lens unit 200 cooperate with each other as a whole, to reach the predetermined criteria, and achieve the required image quality. During the adjustment process, the first lens 11 and the second lens 12 can be adjusted in cooperation for mutual compensation to enable the first lens unit 100 as a whole to meet the adjustment requirements of the optical lens assembly 10, rather than adjusting a single lens to meet the requirements.

Main air spacing 101 is formed between the first lens unit 100 and the second lens unit 200.

In another implementation, the first lens 11 constitutes a first lens unit 100. The second lens 12 and the third lens 13 constitute a second lens unit 200. That is to say, the lens units of the optical lens assembly 10 may be defined in different manners, and the lens units of the optical lens assembly 10 are finally determined according to the predetermined criteria of the design and image quality.

Figure 12:
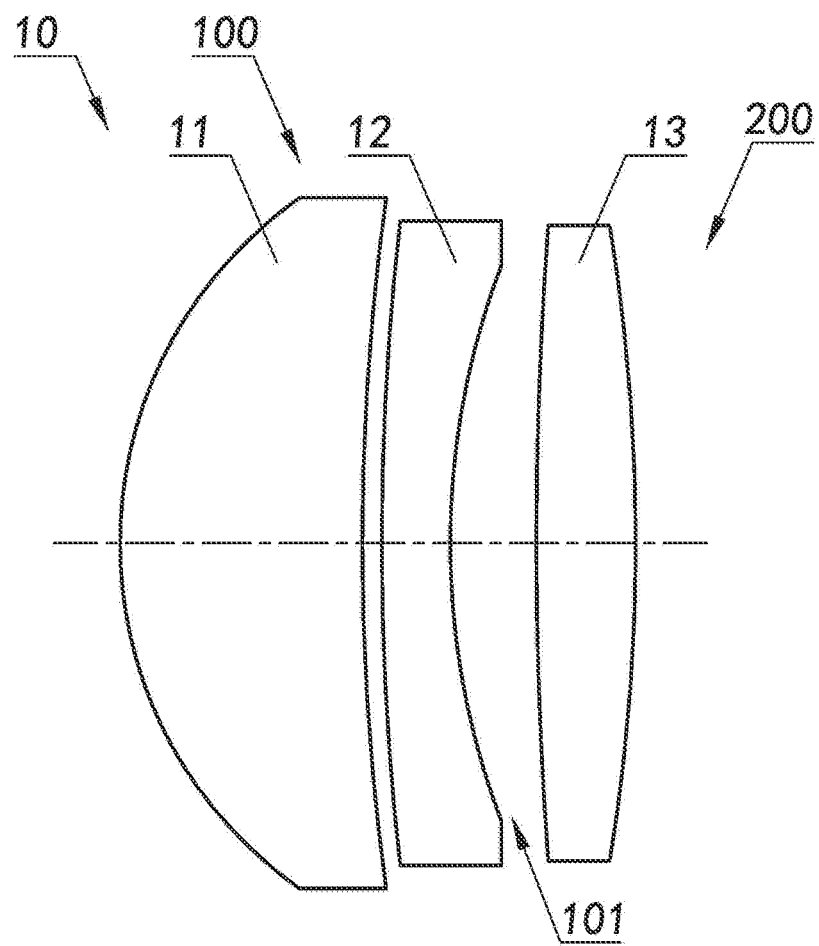
FIG. 12 is a schematic diagram of a specific embodiment of the first implementation of the optical lens assembly according to the above-mentioned preferred embodiment of the present disclosure.

Referring to FIG. 12, a schematic diagram of a specific embodiment of the first implementation of the optical lens assembly according to the above-mentioned preferred embodiment of the present disclosure is illustrated. Here, a possible structure of the lens assembly consisting of three lenses is schematically shown, where a first lens 11 and a second lens 12 constitute a first lens unit 100, and a third lens constitutes a second lens unit 200. Main air spacing 101 is formed between the first lens unit 100 and the second lens unit 200. Definitely, in other specific implementations of the present disclosure, the first lens 11, the second lens 12 and the third lens 13 may be in other shapes and may be combined into units in other options, and the present disclosure is not limited thereto. Specific shapes and parameters of the first lens 11, the second lens 12 and the third lens 13 are determined according to the predetermined criteria and image quality.

Figure 13:
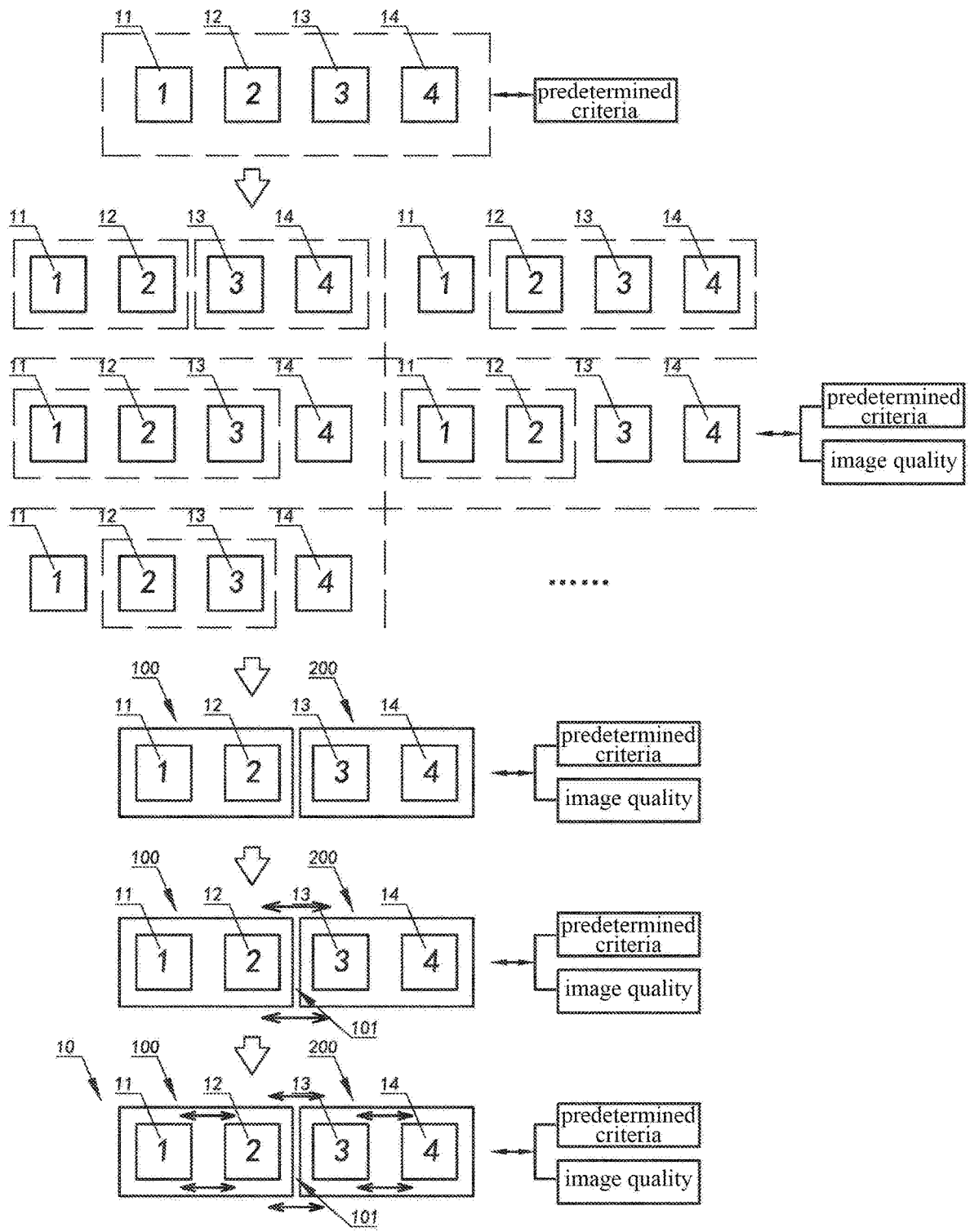
FIG. 13 is a schematic diagram of a second implementation of the optical lens assembly according to the above-mentioned preferred embodiment of the present disclosure.

Referring to FIG. 13, a schematic diagram of a second implementation of the optical lens assembly according to the above-mentioned preferred embodiment of the present disclosure is illustrated. The present disclosure provides an optical lens assembly 10, which is manufactured by using the design method of the above-mentioned embodiment. The optical lens assembly 10 comprises four lenses, namely, a first lens 11, a second lens 12, a third lens 13, and a fourth lens 14. The first lens 11 and the second lens 12 constitute a first lens unit 100, and the third lens 13 and the fourth lens 14 constitute a second lens unit 200.

In the process of designing the optical lens assembly 10, firstly, four lens meeting requirements are selected in advance. Then the four lenses are divided into units. For example, it is finally determined, according to predetermined criteria of the design and image quality, that the first lens 11 and the second lens 12 constitute the first lens unit 100, and the third lens 13 and the fourth lens 14 constitute the second lens unit 200. Further, according to the predetermined criteria and image quality, the first lens unit 100 and the second lens unit 200 are adjusted, so that the first lens unit 100 and the second lens unit 200 cooperate with each other as a whole, to reach the predetermined criteria, and achieve the required image quality. During the adjustment process, the first lens 11 and the second lens 12 can be adjusted in cooperation for mutual compensation so as to enable the first lens unit 100 as a whole to meet the adjustment requirements of the optical lens assembly 10, and the third lens 13 and the fourth lens 14 can be adjusted in cooperation for mutual compensation so as to enable the second lens unit 200 as a whole to meet the adjustment requirements of the optical lens assembly, rather than adjusting a single lens to meet the requirements.

In another implementation, the first lens 11, the second lens 12 and the third lens 13 constitute a first lens unit 100, and the fourth lens 14 constitutes a second lens unit 200.

In another implementation, the first lens 11 constitutes a first lens unit 100, and the second lens 12, the third lens 13 and the fourth lens 14 constitute a second lens unit 200.

In another implementation, the first lens 11 constitutes a first lens unit 100, the second lens 12 constitutes a second lens unit 200, and the third lens 13 and the fourth lens 14 constitute a third lens unit 300.

In another implementation, the first lens 11 constitutes a first lens unit 100, the second lens 12 and the third lens 13 constitute a second lens unit 200, and the fourth lens 14 constitutes a third lens unit 300.

That is to say, there are multiple lens unit division options of the optical lens assembly, and the lens unit division option of the optical lens assembly is finally determined according to the predetermined criteria of the design and imaging information.

In the above-mentioned embodiment of the present disclosure, the lens assembly consisting of three lenses and the lens assembly consisting of four lenses are used as examples for description. However, in other embodiments of the present disclosure, the number of lenses may be larger, for example, 5, 6, 7 or more, and such implementations can all be designed and manufactured by means of the above-mentioned implementation. It should be understood by those skilled in the art that the number of lenses should not considered as a limitation to the present disclosure.

It should be noted that during the production of a camera module, a lens assembly of the camera module may be designed and manufactured by using the method for designing an optical lens assembly in the embodiment corresponding to FIG. 9 to FIG. 15, so that at least one lens unit in the lens assembly is adjustably mounted. Further, the optical lens assembly is adjusted by using the method for compensating for image quality of an optical system in the embodiment corresponding to FIG. 1 to FIG. 8. Whereby, the manufacturing processes and the subsequent adjustment process are combined, providing a camera module with better image quality.

It should be understood by those skilled in the art that the embodiments of the present disclosure shown in the above-mentioned descriptions and the accompanying drawings are provided by way of example only and are not intended to limit the present disclosure. The objective of the present disclosure has been fully and effectively achieved. The functions and structural principles of the present disclosure have been demonstrated and illustrated in the embodiments. Various variations or modifications can be made to the detailed description of the present disclosure without departing from said principles.

What is claimed is:

1. A method for designing an optical lens assembly, comprising the following steps:
   (a) selecting lenses according to predetermined criteria;
   (b) dividing the lenses into at least two lens units; and
   (c) determining, based on imaging information, lens parameters that need to be adjusted, and adjusting the lens parameters on a per-lens basis, so that the optical lens assembly satisfies predetermined criteria and image quality requirements, wherein a basic variable and an auxiliary variable are set in advance, and during the adjustment process, the basic variable remains substantially unchanged, and the auxiliary variable is adjusted, wherein the basic variable is sensitivity of the optical lens assembly.

2. The method for designing an optical lens assembly according to claim 1, wherein in the step (b), a suitable lens unit division option is selected for the optical lens assembly from multiple lens unit division options according to the predetermined criteria and the image quality.

3. The method for designing an optical lens assembly according to claim 1, wherein air spacing between the lens units is main air spacing, and the basic variable is the main air spacing.

4. The method for designing an optical lens assembly according to claim 1, wherein the step (c) comprises a step of adjusting the lenses in each of the lens units for mutual compensation.

5. The method for designing an optical lens assembly according to claim 1, wherein at least one of the lens units comprises at least two lenses.

6. The method of designing an optical lens assembly according to claim 1, wherein at least one of the lens units is an adjustable unit.

\* \* \* \* \*